United States Patent
Lee et al.

(10) Patent No.: US 7,460,466 B2
(45) Date of Patent: Dec. 2, 2008

(54) APPARATUS AND METHOD FOR SIGNAL CONSTITUTION FOR DOWNLINK OF OFDMA-BASED CELLULAR SYSTEM

(75) Inventors: Sok-Kyu Lee, Daejeon (KR); Kwang-Soon Kim, Daejeon (KR); Kyung-Hi Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 266 days.

(21) Appl. No.: 10/539,166

(22) PCT Filed: Jun. 2, 2003

(86) PCT No.: PCT/KR03/01083

§ 371 (c)(1),
(2), (4) Date: Mar. 3, 2006

(87) PCT Pub. No.: WO2004/056022

PCT Pub. Date: Jul. 1, 2004

(65) Prior Publication Data

US 2006/0146867 A1      Jul. 6, 2006

(30) Foreign Application Priority Data

Dec. 13, 2002   (KR) ............... 10-2002-0079598

(51) Int. Cl.
*H04Q 7/00* (2006.01)
(52) U.S. Cl. .............. 370/208; 370/252; 370/311; 370/334; 370/465; 455/452.1; 455/461
(58) Field of Classification Search ............. 370/347, 370/344; 455/562.1
See application file for complete search history.

(56) References Cited

U.S. PATENT DOCUMENTS 6,496,535 B2 *  12/2002  Xu ..................... 375/219

(Continued)

FOREIGN PATENT DOCUMENTS

EP      0 938 208 A1      8/1999

(Continued)

OTHER PUBLICATIONS

Magnus Sandell, et al., "A comparative study of pilot-based channel estimators for wireless OFDM", Sep. 1996, Research Report, LuleA University, Sweden, 1402-1528.

(Continued)

*Primary Examiner*—Chi H. Pham
*Assistant Examiner*—Shick Hom
(74) *Attorney, Agent, or Firm*—Blakely, Sokoloff, Taylor & Zafman LLP

(57) ABSTRACT

Disclosed are an adaptive pilot symbol assignment method that flexibly controls the number of transmit antennas according to each user's moving speed, channel status, or user request, and assigns proper pilot symbols in the downlink of an OFDMA (Orthogonal Frequency Division Multiplexing Access) based cellular system; and a sub-carrier allocation method for high-speed mobile that allocates some sub-carriers to assign proper pilot symbols for ultrahigh-speed mobile users, and the rest of the sub-carriers to the other users to assign proper pilot symbols to the users, on the assumption that the ultrahigh-speed mobile users have a traffic volume almost insignificant to the whole traffic volume.

10 Claims, 9 Drawing Sheets

U.S. PATENT DOCUMENTS

| | | | |
|---|---|---|---|
| 6,545,997 B1 * | 4/2003 | Bohnke et al. | 370/347 |
| 6,836,484 B2 | 12/2004 | Suzuki | 370/465 |
| 6,907,026 B2 * | 6/2005 | Akiyama | 370/344 |
| 6,959,052 B2 * | 10/2005 | Harada et al. | 375/340 |
| 6,993,092 B1 | 1/2006 | Murakami et al. | 375/298 |
| 2001/0004604 A1 * | 6/2001 | Toshimitsu et al. | 455/562 |
| 2001/0055287 A1 | 12/2001 | Sawada et al. | |
| 2001/0055296 A1 * | 12/2001 | Akiyama | 370/344 |

FOREIGN PATENT DOCUMENTS

| | | |
|---|---|---|
| JP | 2001-1030114 | 4/2001 |
| JP | 2001-238269 | 8/2001 |
| WO | WO 02/065685 | 8/2002 |
| WO | WO 2004/056022 A3 | 7/2004 |

OTHER PUBLICATIONS

Cheong Yui Wong, et al, "A Real-time Sub-carrier Allocation Scheme for Multiple Access Downlink OFDM Transmissiom", 0-7803-5435-4/99 1999 IEEE VTC '99 pp. 1124-1128.

Srihari Adireddy, et al, "Detection with Embedded Known Symbols; Optimal Symbol Placement and Equalization"; 0-7803-6293-4 2000 IEEE; pp. 2541-2544.

F. Classen, et al., "Channel estimation units for an OFDM system suitable for mobile communication", in ITG Conference on Mobile Radio, Neu-Ulm, germany, Sep. 1995.

P. Hoeher, et al., "Pilot-symbol-aided channel estimation in time and frequency", Kluwer Academic Publishers, Multi-carrier Spread-Spectrum, 1997.

Ma. J. Fernandez-Getino Garcia, et al., "Efficient pilot patterns for channel estimation in OFDM systems over HF channels", Proc. IEEE VTC1999.

* cited by examiner

- Antenna 0 Pilot
- Antenna 1 Pilot
- Antenna 2 Pilot
- Antenna 3 Pilot
- User 1 Data High Speed Using 1 Antenna
- User 2 Data Low Speed Using 2 Antenna
- User 3 Data Low Speed Using 4 Antenna
- User 4 Data High Speed Using 2 Antenna
- Commom & Control channeles

APPARATUS AND METHOD FOR SIGNAL CONSTITUTION FOR DOWNLINK OF OFDMA-BASED CELLULAR SYSTEM

The present application is a non-provisional application of International Application No. PCT/KR2003/001083, filed Jun. 2, 2003.

BACKGROUND OF THE INVENTION (a) Field of the Invention

The present invention relates to an apparatus and method for signal constitution for a downlink of an OFDMA (Orthogonal Frequency Division Multiplexing Access) based cellular system. More specifically, the present invention relates to an apparatus and method for adaptive pilot symbol assignment and sub-carrier allocation that reduces transmission power consumption and overhead caused by pilot symbols and increases the total data rate on the downlink of an OFDMA-based cellular system.

(b) Description of the Related Art

In the design of pilot assignment, it is necessary to use a sufficiently large number of pilot symbols for the sake of preventing a deterioration of reception performance caused by a channel variation, and to prevent an excessive increase of a power loss or a bandwidth loss caused by pilot symbols above an expected value. The positioning (assignment) of pilot symbols is of a great significance to the receiver of an OFDMA-based system, which estimates a transfer function value of channels in a two-dimensional (time, frequency) space. Hence, both the time domain and the frequency domain must be taken into consideration in pilot symbol assignment so as to transmit the pilot symbols. In case of using a plurality of antennas, the pilot symbols of the multiple antennas are assigned in consideration of both the time domain and the frequency domain.

The distance between pilot symbols must be quite small in designing pilot symbols in the worst environment, or when using non-optimal channel estimation filters having a lower complexity.

Let $f_{sc}$ be a sub-carrier bandwidth, then the maximum pilot distance $N_F$ in the frequency domain based on the conventional sampling theory (F. Classen, M. Speth, and H. Meyr, "Channel estimation units for an OFDM system suitable for mobile communication", in ITG Conference on Mobile Radio, Neu-Ulm, Germany, September 1995) is determined by the following formula:

[Formula 1]

$$N_F \leq \frac{1}{\tau_{max} f_{sc}}$$

where $\tau_{max}$ is the maximum exceedance delay time of a channel. The maximum pilot distance $N_T$ in the frequency domain is determined by the following formula:

[Formula 2]

$$N_T \leq \frac{1}{2 f_D T_s}$$

where $f_D$ is the maximum Doppler frequency; and $T_S$ is the symbol time.

The symbol time $T_S$, during which the maximum pilot distance is proportional to the coherent time, is normalized by the number of symbols. So, the maximum pilot distance in the time domain is proportional to the coherent bandwidth and normalized by the sub-carrier bandwidth.

The balanced design (P. Hoeher et al., "Pilot-symbol-aided channel estimation in time and frequency", Multi-carrier Spread-Spectrum, accepted for publication in Kluwer Academic Publishers, 1997) defines that the estimation uncertainty in the time domain is equal to that in the frequency domain. Here, P. Hoeher et al. suggest a design guide having two-fold oversampling as defined by a heuristic formula as follows:

$$2 f_D T_S \cdot N_T \approx \tau_{max} f_{sc} \cdot N_F \approx \frac{1}{2}$$ [Formula 3]

where $N_F$ is the pilot distance in the frequency domain. The above-mentioned pilot symbol assignment is primarily a rectangular pilot symbol assignment, which is illustrated in FIG. 1. FIGS. 2 and 3 show a straight pilot symbol assignment and a hexagonal pilot symbol assignment, respectively. Generally, the hexagonal pilot symbol assignment allows more efficient sampling, compared with two-dimensional signals, and exhibits excellent performance relative to other assignments. An example of the pilot symbol assignment is disclosed in "Efficient pilot patterns for channel estimation in OFDM systems over HF channels" (M. J. Fernandez-Getino Garcia et al., in *Proc IEEE VTC*1999).

As the pilot symbol assignment becomes denser, the channel estimation performance becomes more excellent but the data rate is decreased. Hence, a trade-off lies between the data rate and the channel estimation performance (i.e., pilot symbol distance).

There exits a pilot symbol distance that optimizes the trade-off between the improved channel estimation and the signal-to-noise ratio (SNR) reduced by data symbols. By varying the pilot symbol distances $N_F$ and $N_T$, the values approximate to the optimum with reference to the performance of bit error rate (BER) can be determined. In FIG. 1, for example, $N_F=4$ and $N_T=3$ in optimum means that one twelfth (about 8%) of the consumed transmission power and bandwidth are used for pilot symbols.

In this optimal assignment of pilot symbols, the channel environment and the moving speed of the mobile users are of a great importance as parameters to be considered.

SUMMARY OF THE INVENTION

It is an advantage of the present invention to provide an apparatus and method for adaptive pilot symbol assignment and sub-carrier allocation that reduces transmission power and overhead caused by pilot symbols and increases the total data rate on a downlink in an OFDMA-based cellular system.

In one aspect of the present invention, there is provided a downlink signal constitution method, which is for a downlink of a cellular system using an orthogonal frequency division multiplexing access method, the downlink signal constitution method including: (a) coding, interleaving, and symbol-mapping data of a common channel and a control channel, and assigning fundamental pilot symbols, necessary for a demodulation of the common channel and the control channel, to time, frequency, and antenna; (b) receiving data to be transmitted through a traffic channel of each user, and determining a transmission mode of each user according to the user's moving speed, channel information, and traffic requirement; (c) determining additional pilot symbols, additionally necessary for a demodulation of the traffic channel, according to the transmission mode and moving speed by users; and (d) coding, interleaving and symbol-mapping the data of the traffic channel according to the transmission mode by users, and assigning the mapped symbols and the additional pilot symbols according to time, frequency and antenna.

In another aspect of the present invention, there is provided a downlink signal constitution method, which is for a cellular system using an orthogonal frequency division multiplexing access method, the downlink signal constitution method including: (a) dividing users into a first user group including high-speed mobile users and a second user group including the rest of the users, in consideration of each user's moving speed and traffic volume; (b) allocating a first sub-carrier band for the first user group, and a second sub-carrier band for the second user group; and (c) assigning pilot symbols to the first and second sub-carrier bands, the pilot symbols assigned to the first sub-carrier band being different in assignment density from the pilot symbols assigned to the second sub-carrier.

In a further aspect of the present invention, there is provided a downlink signal constitution apparatus, which is for a cellular system using an orthogonal frequency division multiplexing access method, the downlink signal constitution apparatus including: a first memory for storing traffic channel information of each user; a second memory for storing channel information, traffic requirement, and moving speed information of each user; a transmission user and transmission mode determiner for determining a transmission user and a transmission mode according to a defined method using the information stored in the second memory; a traffic channel processor for reading the traffic channel information stored in the first memory according to the transmission mode determined by the transmission user and transmission mode determiner, and performing coding, interleaving, and symbol-mapping of the traffic channel; an additional pilot symbol generator for generating additional pilot symbols necessary for a demodulation of the traffic channel, using the transmission mode determined by the transmission user and transmission mode determiner and the moving speed information stored in the second memory; and a time/sub-carrier/antenna mapper for multiplying the traffic channel symbols output from the traffic channel processor and the additional pilot symbols output from the additional pilot symbol generator by a channel gain by channels/users, and mapping the resulting symbols to time, sub-carrier, and antenna by a defined method.

In a still further aspect of the present invention, there is provided a recording medium with a built-in program, which implements a downlink signal constitution method for a cellular system using an orthogonal frequency division multiplexing access method, the program including: a function of coding, interleaving, and symbol-mapping data of a common channel and a control channel, and assigning fundamental pilot symbols, necessary for a demodulation of the common channel and the control channel, to time, frequency, and antenna; a function of receiving data to be transmitted through a traffic channel of each user, and determining a transmission mode of each user according to the user's moving speed, channel information, and traffic requirement; a function of determining additional pilot symbols, additionally necessary for a demodulation of the traffic channel, according to the transmission mode and moving speed by users; and a function of coding, interleaving and symbol-mapping the data of the traffic channel according to the transmission mode by users, and assigning the mapped symbols and the additional pilot symbols according to time, frequency, and antenna.

In a still further aspect of the present invention, there is provided a recording medium with a built-in program, which implements a downlink signal constitution method for a cellular system using an orthogonal frequency division multiplexing access method, the program including: a function of dividing users into a first user group including high-speed mobile users and a second user group including the rest of the users, in consideration of each user's moving speed and traffic volume; a function of allocating a first sub-carrier band for the first user group, and a second sub-carrier band for the second user group; and a function of assigning pilot symbols to the first and second sub-carrier bands, the pilot symbols assigned to the first sub-carrier band being different in assignment density from the pilot symbols assigned to the second sub-carrier.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
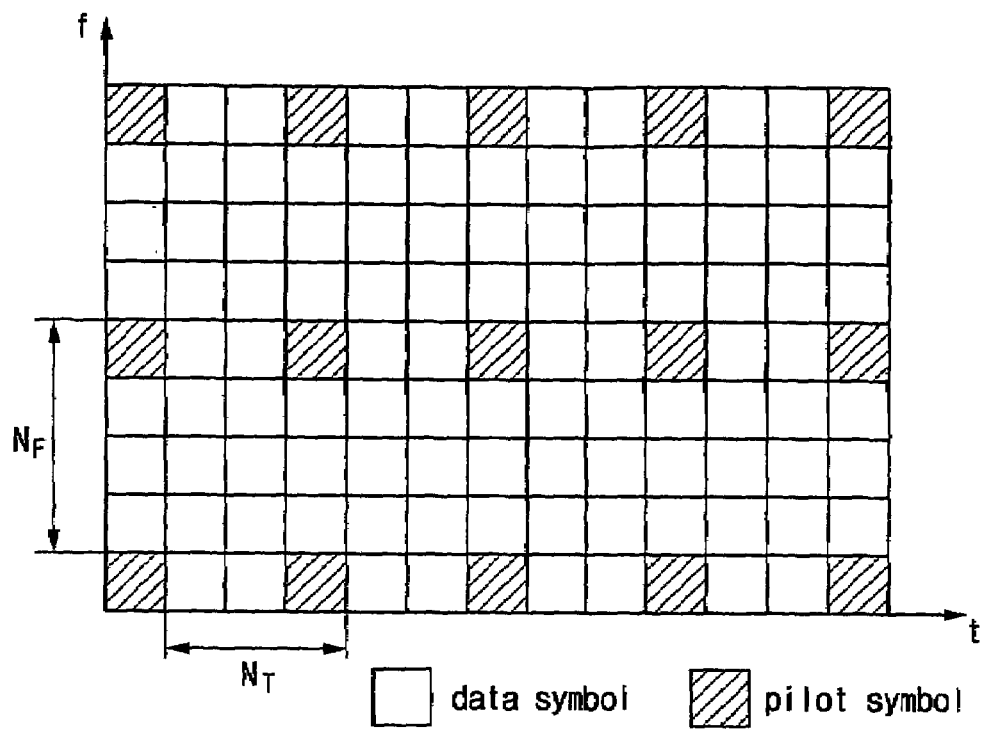
FIG. 1 is an exemplary diagram of a rectangular pilot symbol assignment.
Figure 2:
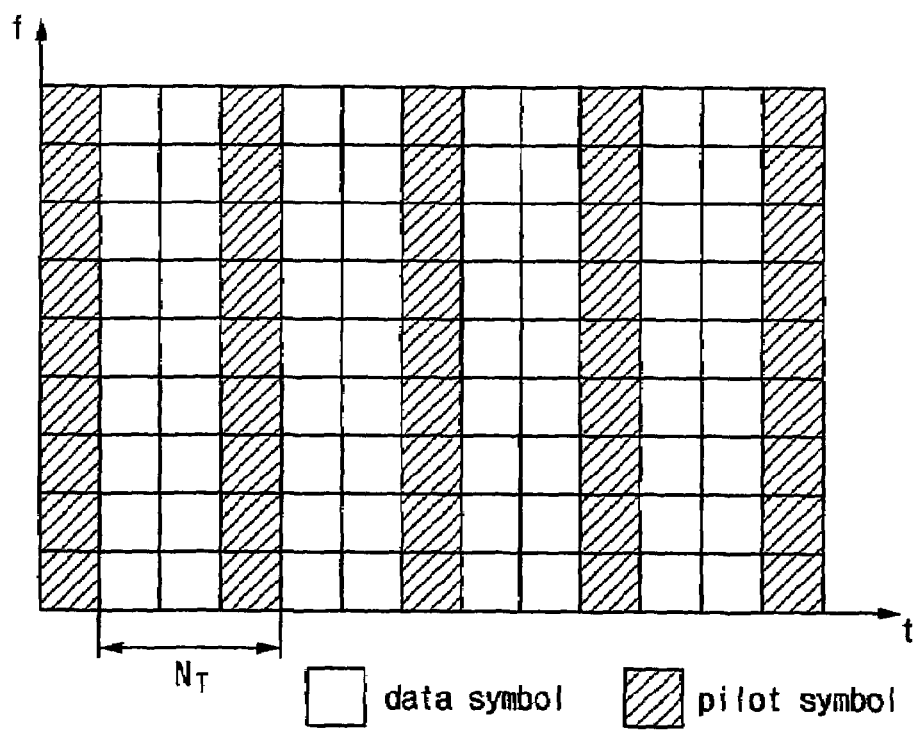
FIG. 2 is an exemplary diagram of a straight pilot symbol assignment.
Figure 3:
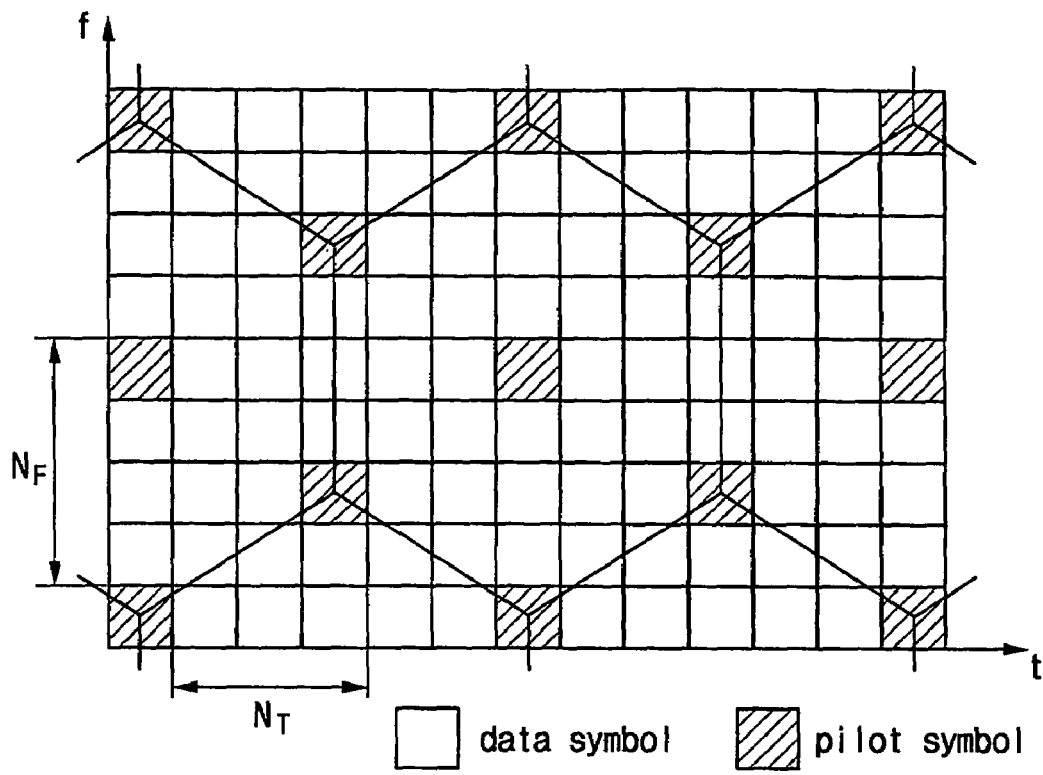
FIG. 3 is an exemplary diagram of a hexagonal pilot symbol assignment.
Figure 4:
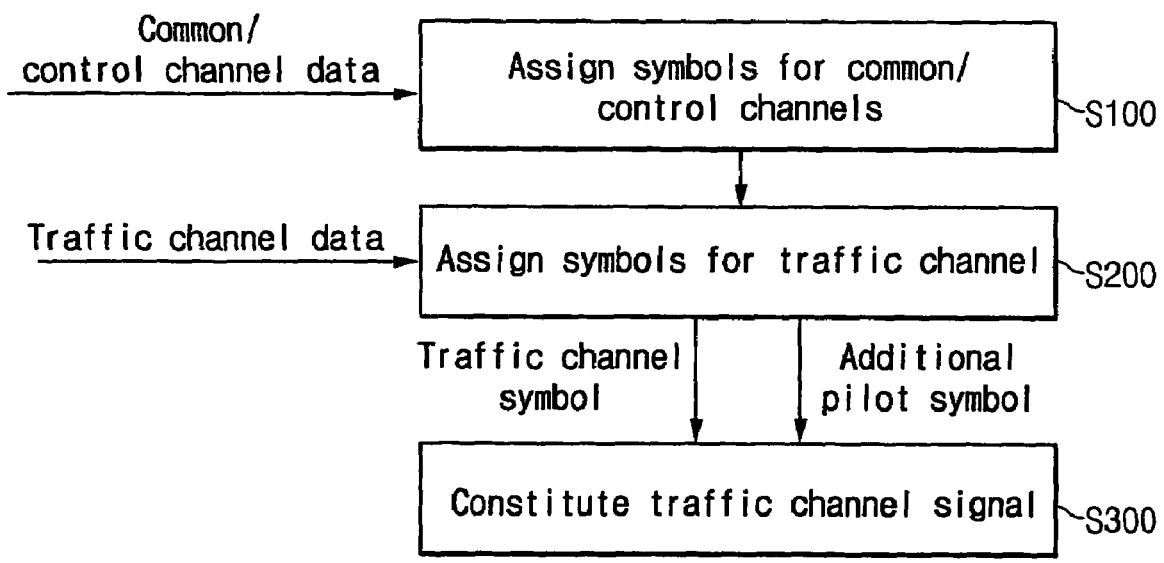
FIG. 4 is a flow chart showing a symbol assignment method for a downlink of an OFDMA-based cellular system according to an embodiment of the present invention.

FIG. 4 is a diagram showing a downlink symbol assignment method for an OFDMA-based cellular system according to an embodiment of the present invention.

The symbol assignment method according to the embodiment of the present invention comprises, as shown in FIG. 4, a symbol assignment step S100 for common/control channels, a symbol assignment step S200 for traffic channels, and a traffic channel signal constitution step S300.

More specifically, the symbol assignment step S100 for common/control channels performs coding, interleaving, and symbol mapping on data of common and control channels, and assigns the mapped symbols to time, frequency, and antennas. Also, fundamental pilot symbols necessary for demodulation of the common and control channels are assigned to time, frequency, and antennas.

The symbol assignment step S200 for traffic channels receives data to be transferred through the traffic channel of each user; determines each user's transmission mode according to the user's moving speed, channel information, and traffic requirement; performs coding, interleaving, and symbol-mapping according to the transmission mode of the user; and assigns the traffic channel symbols of each user to time, frequency, and antennas. Also, pilot symbols additionally necessary for a demodulation of the traffic channel are generated according to the transmission mode by users, and assigned to time, frequency, and antennas.

The traffic channel signal constitution step S300 constitutes the signal of the traffic channel using the traffic channel symbols of each user and the additional pilot symbols output from the step S200.

Figure 5:
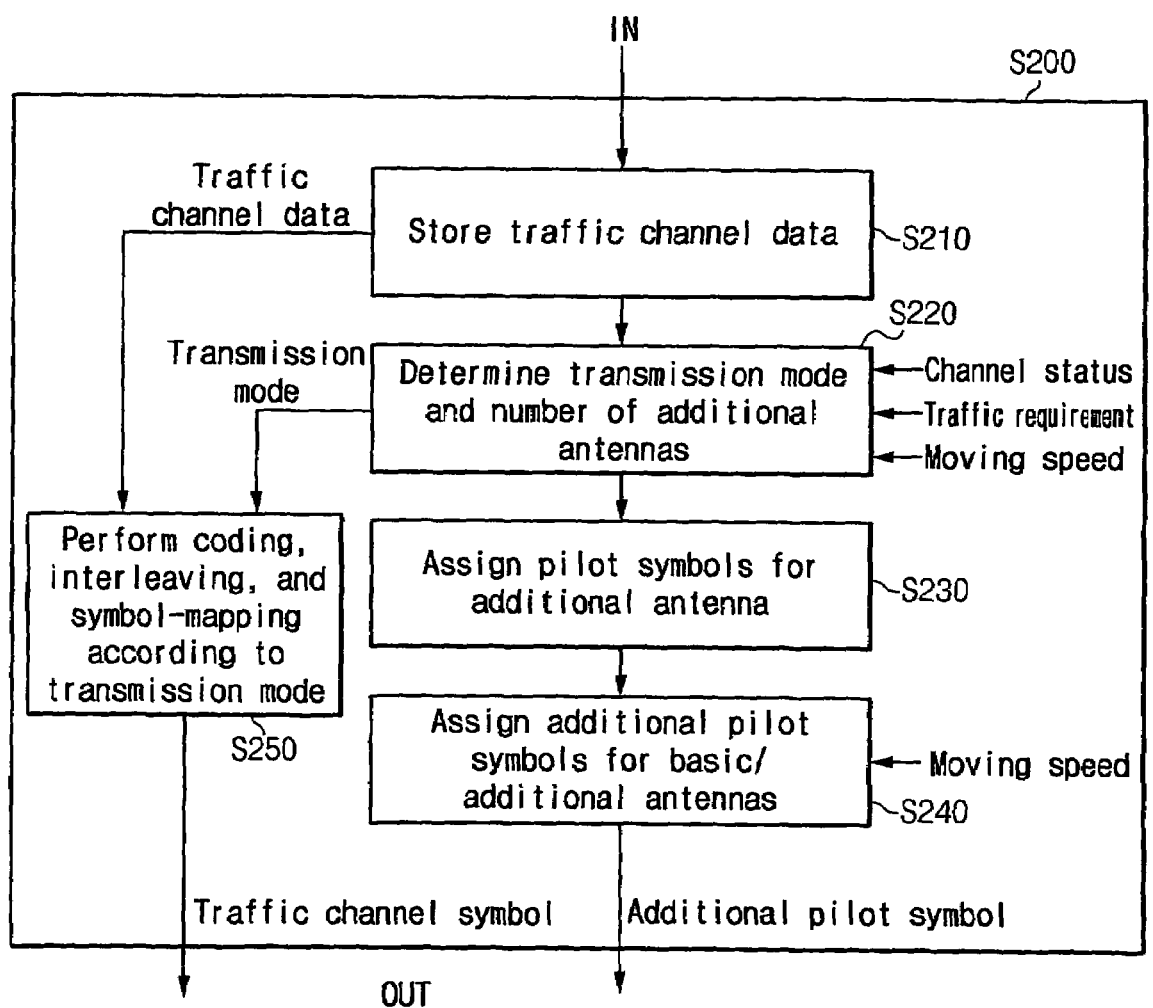
FIG. 5 is a detailed diagram showing a symbol assignment method for the traffic channel of FIG. 4.

FIG. 5 is a detailed diagram of the symbol assignment S200 for traffic channels shown in FIG. 4.

When the base station has information about the moving speed and channel status of each user, a required number of pilot symbols are inserted, reducing transmission power and overhead caused by pilot symbols.

According to the embodiment of the present invention, the transmitter antennas are divided into basic antennas and additional antennas. The basic antenna refers to an antenna used for transmitting common and control channels, while the additional antenna refers to an antenna additionally used to enhance the transmission rate or performance of the traffic channel of the user.

In the OFDMA system, one frequency band is divided into a plurality of sub-carrier bands to transmit the traffic channel of each user through the allocated sub-carriers. Namely, the OFDMA system properly allocates a sub-carrier band according to the user's moving speed, channel environment, and traffic requirement, or selects a defined sub-carrier band, determines the number of transmitter antennas according to the user's moving speed, channel environment, and traffic requirement, and then assigns additionally necessary pilot symbols to the allocated sub-carrier band.

More specifically, as illustrated in FIG. 5, the OFDMA system stores data to be transmitted through a traffic channel, in step S210.

The transmission mode and the number of additional antennas are determined in consideration of the user's channel information (i.e., channel status), traffic requirement, and moving speed, in step S220.

In step S230, the system assigns pilot symbols for additional antennas, when the additional antennas are needed according to the transmission mode determined in the step S220.

The additional pilot symbols according to the moving speed of the basic antennas and the additional antennas are then assigned in consideration of the user's moving speed, in step S240.

The system performs coding, interleaving, and symbol mapping using the transmission mode determined in the step S220 and the traffic channel data stored in the step S210 to generate coded, interleaved, and symbol-mapped traffic channel symbols, in step S250.

In the step S220, the transmission mode for each user is determined independently, or the transmission mode for multiple users is determined by optimization in consideration of the total transmission rate, the quality of service, or the total transmission power.

Figure 6:
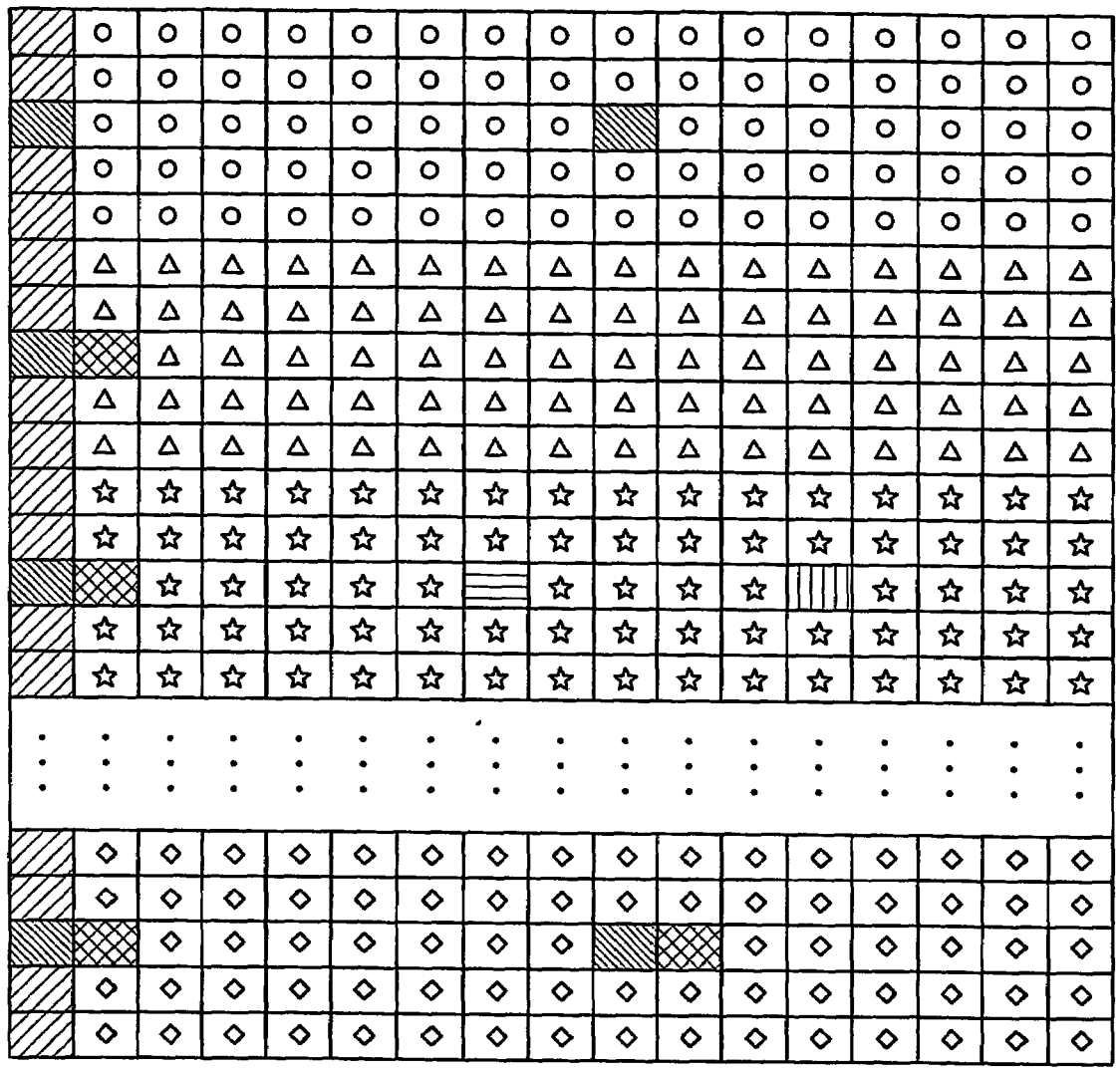
FIG. 6 is a diagram showing a downlink signal constitution method according to the embodiment of the present invention.

FIG. 6 is an exemplary diagram showing a downlink signal constitution method according to the embodiment of the present invention.

In FIG. 6, when using one basic antenna and at most three additional antennas, the pilot symbols are assigned to the sub-carrier band, which is allocated to a user 1 moving at high speed with one basic antenna, a user 2 moving at low speed with one additional antenna, a user 3 moving at low speed with three additional antennas, and a user 4 moving at high speed with one additional antenna.

In FIG. 6, seventeen OFDM symbols constitute one slot. FIG. 6 shows the case where a demodulation can be enabled with one pilot symbol in one slot in the time domain because the moving speed is low.

Referring to FIG. 6, the common and control channels are used to transmit OFDM symbols such as pilot symbols of the basic antenna, and demodulate them irrespective of the moving speed of the users. The traffic channel is used to transmit the additional pilot symbols necessary according to the moving speed of the users and the number of antennas in the allocated sub-carrier band by users.

Figure 7:
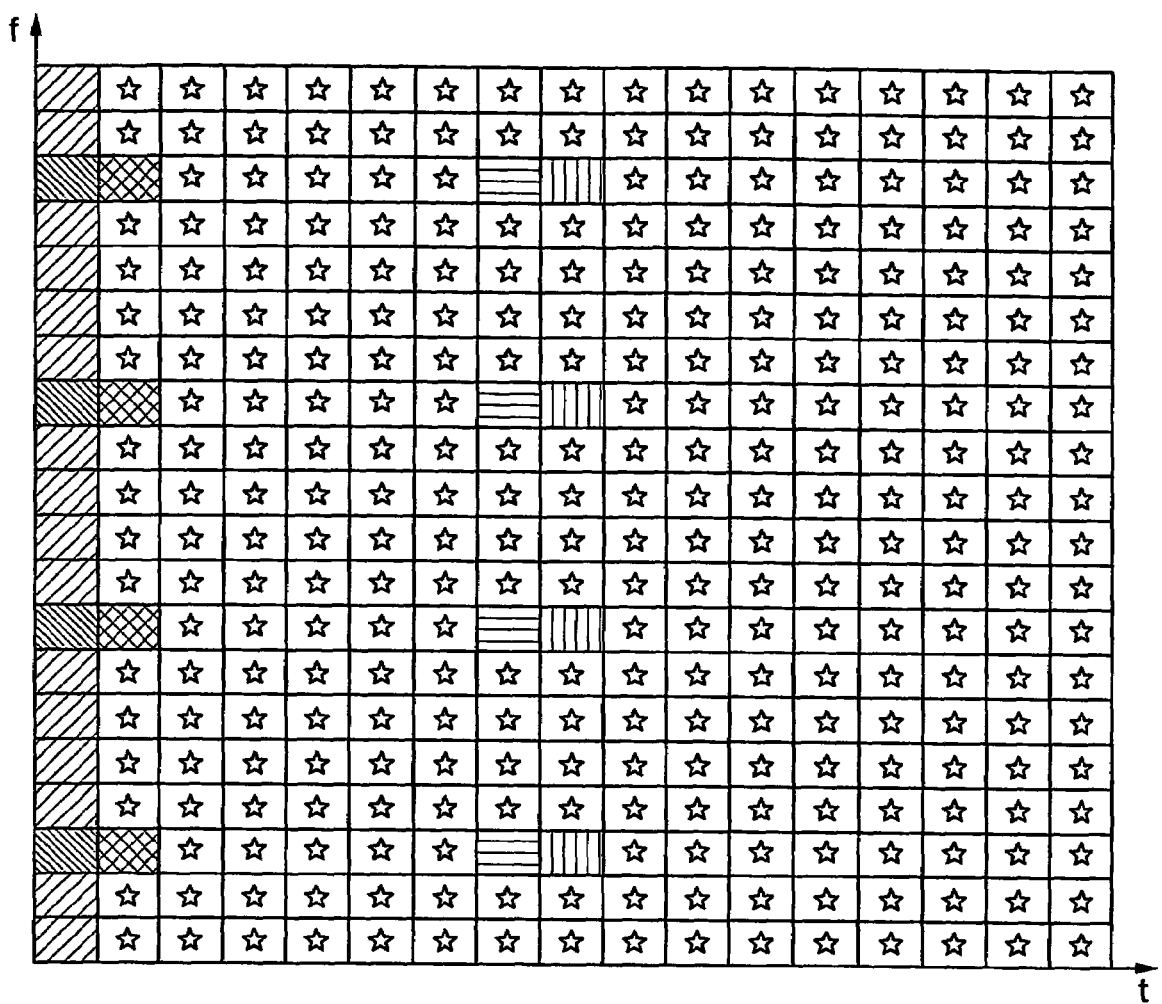
FIG. 7 is an exemplary diagram of a pilot symbol assignment for low-speed mobile users using four antennas.

FIG. 7 is an exemplary diagram showing a pilot symbol assignment in the sub-carrier band allocated to a low-speed mobile user using one basic antenna and three additional antennas according to the embodiment of the present invention.

The pilot symbols ($N_F=5$) of the basic antenna (antenna 0) and the common and control channels are transmitted for the first OFDMA symbol, and the traffic channel is transmitted for the other OFDMA symbols. The pilot symbols of the additional antennas (antenna 1, antenna 2, antenna 3) are additionally transmitted. In the meantime, the symbols of the traffic channel can be generated by any one of the following methods: (1) a first method of generating traffic channel symbols previously in consideration of the number of additional pilots; (2) a second method of generating the maximum number of traffic channel symbols and then puncturing at positions to transmit additional pilot symbols; and (3) a third method of generating traffic channel symbols previously in consideration of the number of a part of additional pilot symbols, and then puncturing at positions to transmit the rest of the additional pilot symbols.

Figure 8:
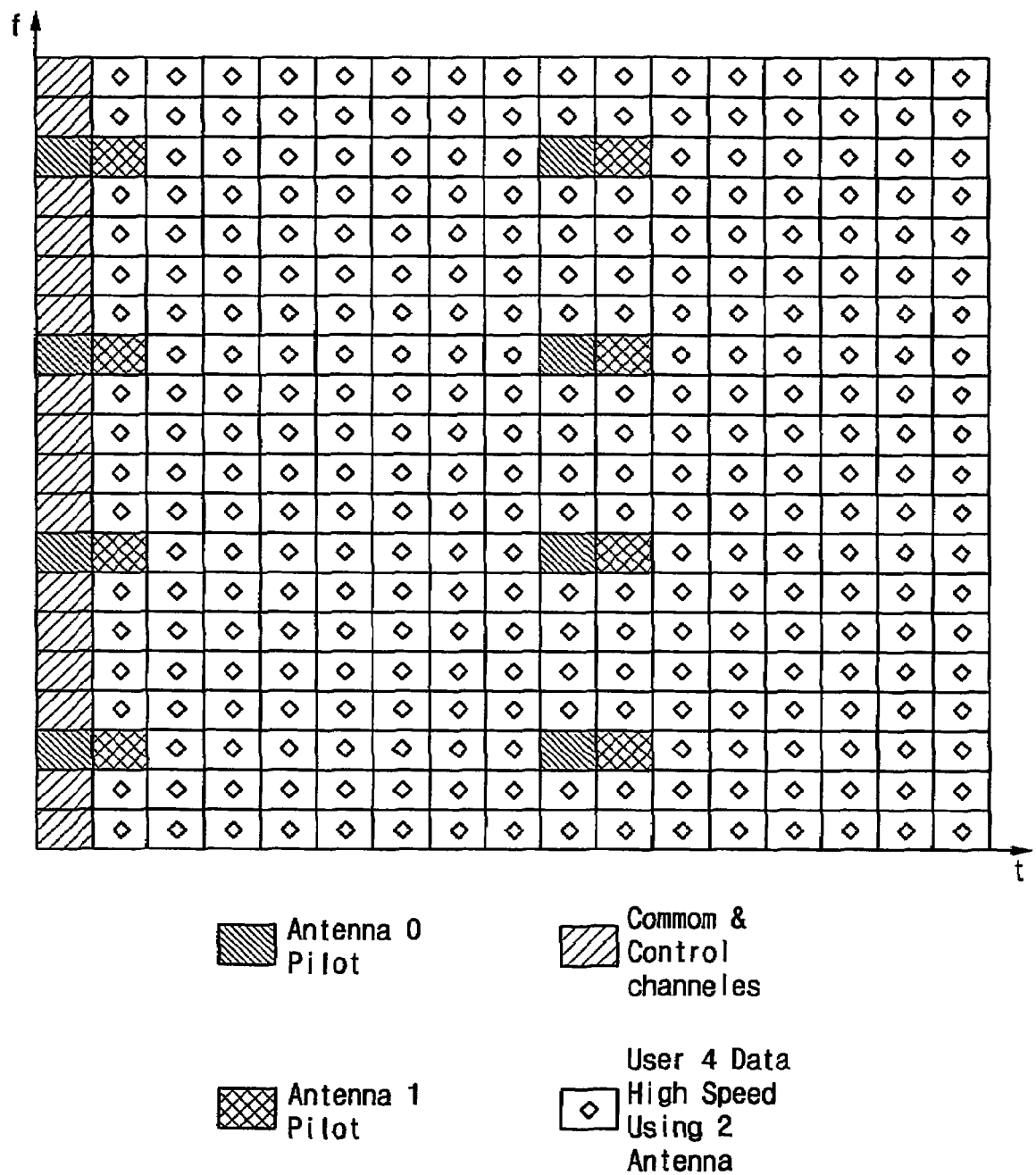
FIG. 8 is an exemplary diagram of a pilot symbol assignment for high-speed mobile users using two antennas.

FIG. 8 is an exemplary diagram showing a pilot symbol assignment in the sub-carrier band allocated to a high-speed mobile user using one basic antenna and one additional antenna according to the embodiment of the present invention.

The pilot symbols ($N_F=5$) of the basic antenna (antenna 0) and the common and control channels are transmitted for the first OFDMA symbol, and the traffic channel is transmitted for the other OFDMA symbols. The pilot symbols of the additional antenna (antenna 1) are additionally transmitted.

In the meantime, the symbols of the traffic channel can be generated by one of the following methods: (1) a first method of generating traffic channel symbols previously in consideration of the number of additional pilots; (2) a second method of generating the maximum number of traffic channel symbols and then puncturing at positions to transmit additional pilot symbols; and (3) a third method of generating traffic channel symbols previously in consideration of the number of a part of additional pilot symbols, and then puncturing at positions to transmit the rest of the additional pilot symbols.

In summary, there are four cases of pilot symbol assignment in relation to the number of antennas of the traffic channel:

(1) moving at a low speed with one basic antenna—using no additional pilot symbol;

(2) moving at low speed with additional antennas—assigning pilot symbols for additional antennas;

(3) moving at high speed with one basic antenna—additionally inserting pilot symbols for basic antenna in conformity to the high-speed environment; and (4) moving at high speed with additional antennas—additionally inserting pilot symbols for basic and additional antennas in consideration of the moving speed.

To use the methods illustrated in FIGS. 4 to 8, the base station must have information about the channel information, moving speed, and traffic requirement of each user. The moving speed is measured at the base station, or is measured at the mobile station and then reported to the base station. The traffic requirement is reported to the base station by the mobile station, or is detected by the base station from the amount or characteristic of data to be transmitted. The channel information is measured at the base station, or is measured at the mobile station and then reported to the base station. The former case is primarily for the TDD (Time Division Duplex) based system, and the latter one is for the FDD (Frequency Division Duplex) based system.

In the former case, the mobile station sends a signal (e.g., preamble, pilot, etc.) for channel measurement, and then the base station measures the channel information of the uplink by the respective antennas based on the received signal. The base station acquires channel information of the downlink using the reciprocity of channels because the uplink and the downlink have the same channel information because they use the same frequency band.

Contrarily, in the FDD system, the mobile station previously sends pilots of additional antennas so as to perform a channel estimation of the additional antennas.

Figure 9:
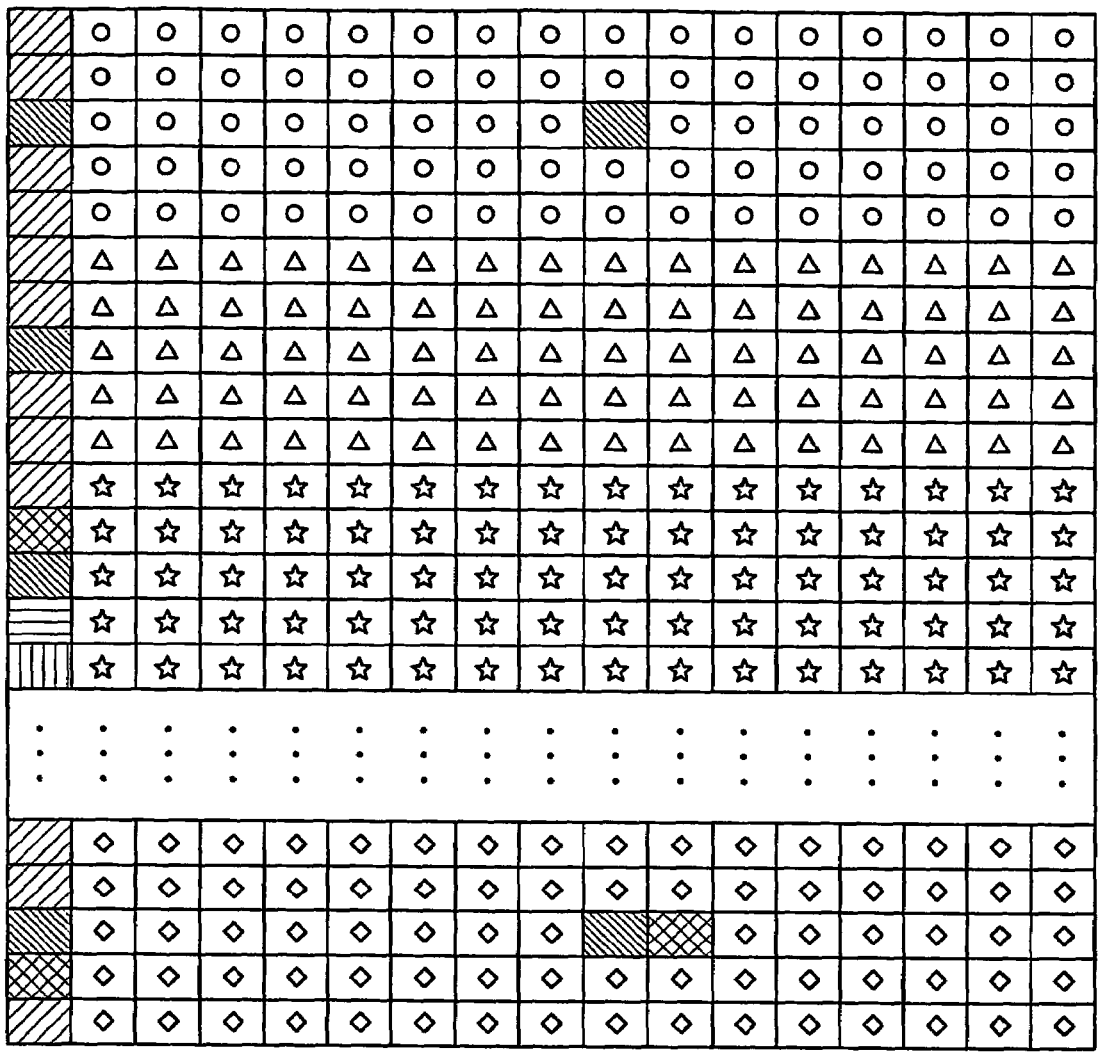
FIG. 9 is an exemplary diagram showing a downlink signal constitution method when using additional antennas only in a part of the whole band in an FDD system.

FIG. 9 is an exemplary diagram showing a downlink signal constitution method when using additional antennas only in a defined band in the FDD system.

Namely, FIG. 9 shows the addition of an appropriate quantity of pilot symbols for additional antennas to the first symbol only in a defined band so as to reduce overhead caused by transmitting pilots of additional antennas.

In FIG. 9, one basic antenna (antenna 1) is used, and the third band is a band available for using at most three additional antennas, the fourth band being a band available for using at most one additional antenna, the other bands not being available for using additional antennas.

Figure 10:
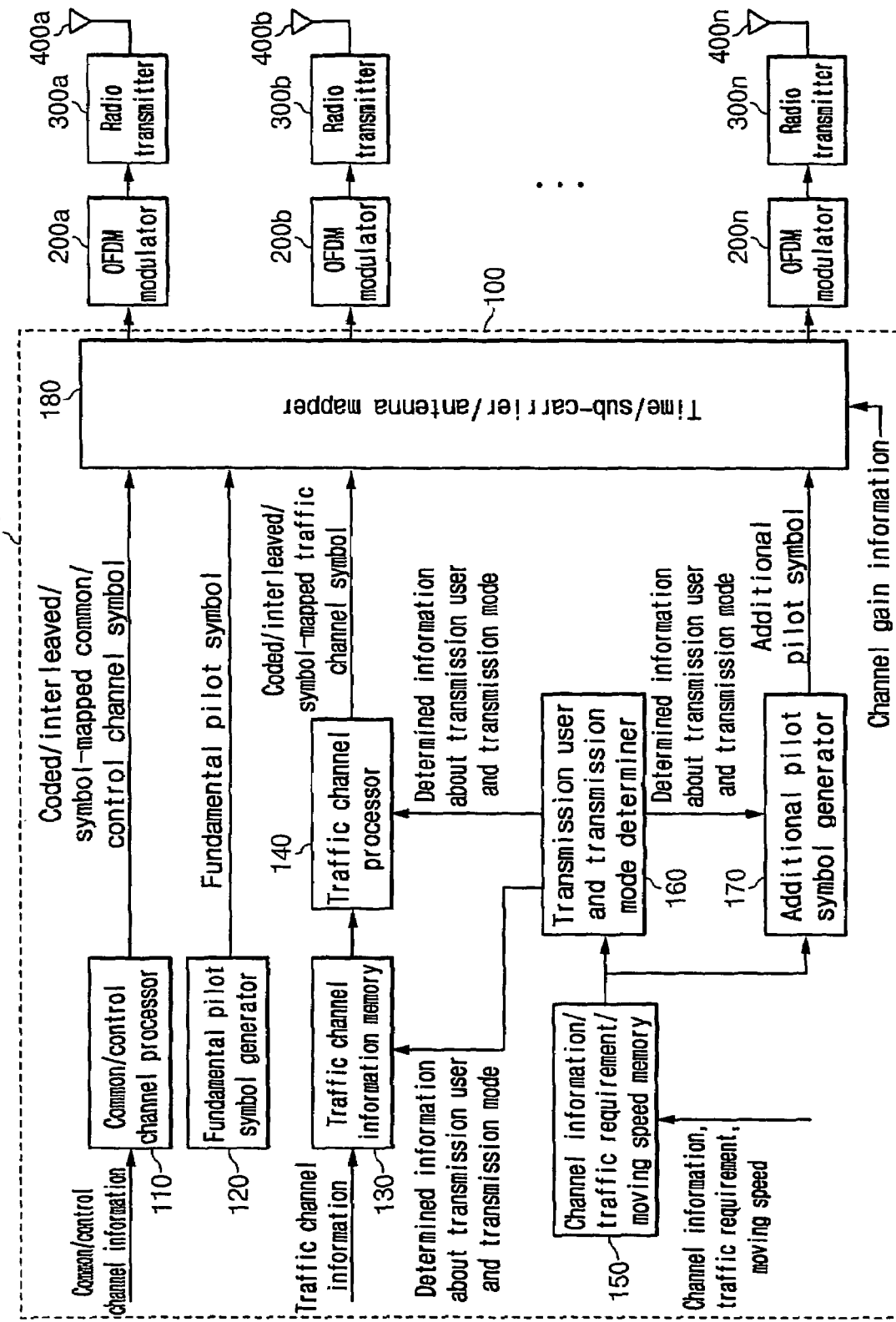
FIG. 10 is a diagram of a downlink signal constitution apparatus for an OFDMA-based cellular system according to the embodiment of the present invention.

FIG. 10 is a diagram of a downlink signal constitution apparatus 100 for an OFDMA-based cellular system according to the embodiment of the present invention.

The downlink signal constitution apparatus 100 comprises a common/control channel processor 110, a fundamental pilot symbol generator 120, a traffic channel information memory 130, a traffic channel processor 140, a channel information/traffic requirement/moving speed memory 150, a transmission user and transmission mode determiner 160, an additional pilot symbol generator 170, and a time/sub-carrier/antenna mapper 180.

The common/control channel processor 110 encodes and interleaves the common/control channel information, and maps the coded and interleaved common/control channel information to symbols to generate a coded/interleaved/symbol-mapped common/control channel symbol. The fundamental pilot symbol generator 120 generates a fundamental pilot symbol. The fundamental pilot symbol is a pilot symbol transmitted irrespective of the transmission mode of the traffic channel of the user, and in FIGS. 6 and 9, refers to a pilot symbol transmitted for the first OFDM symbol of the slot.

The traffic channel information memory 130 stores the user's traffic channel information, and the channel information/traffic requirement/moving speed memory 150 stores the user's channel information, traffic requirement, and moving speed information.

The transmission user and transmission mode determiner 160 determines the transmission user and each transmission mode according to a defined method using the information stored in the channel information/traffic requirement/moving speed memory 150. The traffic channel processor 140 reads the traffic channel information stored in the traffic channel information memory 130 according to the transmission mode determined by the transmission user and transmission mode determiner 160, encodes and interleaves the traffic channel information, and maps the coded and interleaved traffic channel information to generate a coded/interleaved/symbol-mapped traffic channel symbol.

The additional pilot symbol generator 170 generates an additional pilot symbol according to the number of antennas and the moving speed determined by each user's transmission mode. The additional pilot symbol is a pilot symbol additionally transmitted other than the fundamental pilot symbol for the respective users, and in FIGS. 6 and 9, refers to the pilot symbols other than the pilot symbol transmitted for the first OFDM symbol of the slot.

The time/sub-carrier/antenna mapper 180 multiplies the coded/interleaved/symbol-mapped common/control channel symbol generated from the common/control channel processor 110, the coded/interleaved/symbol-mapped traffic channel symbol generated from the traffic channel processor 130, the fundamental pilot symbol generated from the fundamental pilot symbol generator 120, and the additional pilot symbol generated from the additional pilot symbol generator 170 by channel gain information by channels or users, and maps the channel symbols to time, sub-carrier, and antenna by a defined method.

The time/sub-carrier/antenna mapper 180 can use any one of the following methods: (1) a first method of generating traffic channel symbols previously in consideration of the number of additional pilots; (2) a second method of generating the maximum number of traffic channel symbols and then puncturing at positions to transmit additional pilot symbols; and (3) a third method of generating traffic channel symbols previously in consideration of the number of a part of additional pilot symbols, and then puncturing at positions to transmit the rest of the additional pilot symbols.

The output of the downlink signal constitution apparatus 100 is OFDM-modulated through OFDM modulators 200a, 200b, . . . , and 200n, and is subjected to D/A conversion, frequency up-conversion, filtering, and amplification through radio transmitters 300a, 300b, . . . , and 300n, and transmitted via antennas 400a, 400b, . . . , and 400n.

Figure 11:
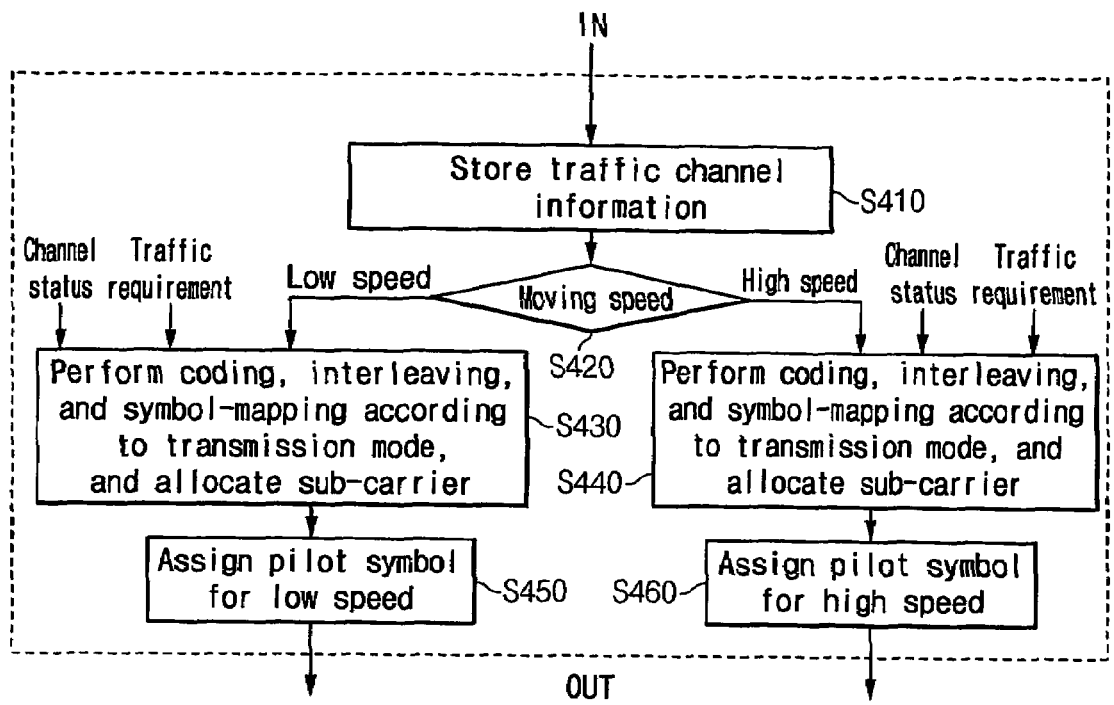
FIG. 11 is a detailed flow chart showing a pilot symbol assignment according to sub-carrier allocation.

FIG. 11 is a detailed flow chart of a pilot symbol assignment method according to sub-carrier allocation in the embodiment of the present invention.

According to the embodiment of the present invention, some of the sub-carriers are allocated according to the traffic requirement and the moving speed by an appropriate method in the downlink of the OFDMA-based cellular system, and then the pilot symbols of the traffic channel of the corresponding sub-carrier are properly assigned by the pilot symbol assignment method according to the moving speed, or the like.

More specifically, referring to FIG. 11, data to be transmitted through a traffic channel are stored, in step S410, and it is determined in step S420 whether the moving speed is high or low.

If the moving speed is determined as low in the step S420, then the sub-carriers are allocated according to channel status, traffic requirement, and low-speed determination information, in step S430, and pilot symbols for low speed are assigned to the allocated sub-carriers, in step S450.

If the moving speed is determined as high in the step S420, then the sub-carriers are allocated according to channel status, traffic requirement, and high-speed determination information, in step S440, and pilot symbols for high speed are assigned to the allocated sub-carriers, in step S460.

The pilot symbols assigned in the steps S450 and S460 are output to a data symbol assignment input.

Figure 12:
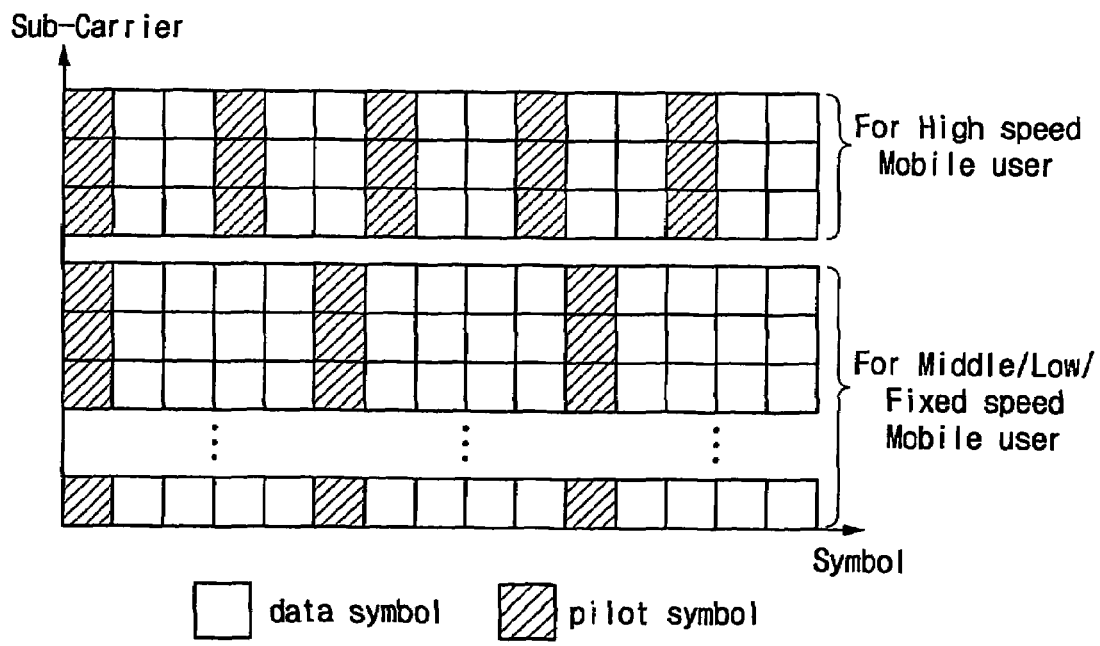
FIG. 12 is an exemplary diagram showing a pilot symbol assignment according to a sub-carrier allocation for high-speed mobile users and a moving speed.

FIG. 12 is an exemplary diagram of sub-carrier allocation according to the moving speed of the user, and pilot symbol assignment of the corresponding sub-carrier.

Typically, sub-carrier allocation is achieved by users or data types. Here, the sub-carriers are allocated according to each user's moving speed. In the case of pilot symbol assignment for mobile users in an express train running at a speed of 250 km/h in consideration of the user's quality of service, for example, the pilot symbols are assigned very densely with a small pilot symbol distance, and the number of data symbols to be transmitted is reduced with a deterioration of the data rate. However, for users who are stationary or moving at a speed of less than 120 km/h, the pilot symbols are much more densely assigned than needed, with a deterioration of efficiency. Thus the users can be divided into a user group having a moving speed of 250 km/h and a user group having a moving speed of less than 120 km/h, based on the fact that there is no speed to be considered between 120 and 250 km/h.

In FIG. 12, when the high-speed mobile users are the users of an express train running at a speed of 250 km/h and the proportion of users in service is less than 0.1% of all users all over the country, only some of all the sub-carriers can be allocated to the high-speed mobile users. The sub-carriers allocated must assign proper pilot symbols to the high-speed mobile users. The rest of the sub-carriers are allocated to mobile users having a speed of less than 120 km/h, and proper pilot symbols are assigned to the users. In this case, the pilot symbols of the sub-carriers for the high-speed mobile users are inserted more densely than those of the rest of the sub-carriers, thus enhancing the data rate of the whole system.

While this invention has been described in connection with what is presently considered to be the most practical and preferred embodiment, it is to be understood that the invention is not limited to the disclosed embodiments, but, on the contrary, is intended to cover various modifications and equivalent assignments included within the spirit and scope of the appended claims.

The present invention determines the number of transmit antennas according to each user's moving speed, channel status, or user request, and properly assigns pilot symbols in the downlink of an OFDMA-based cellular system, thereby reducing a transmission power consumption and an overhead caused by pilots.

Furthermore, the present invention allocates some sub-carriers to assign proper pilot symbols for ultrahigh-speed mobile users, and the rest of the sub-carriers to the other users to assign proper pilot symbols to the users, based on the fact that the ultrahigh-speed mobile users have a traffic volume almost insignificant to the whole traffic volume, thereby optimizing the transmission power caused by the pilot symbols as well as enhancing the total data rate.

What is claimed is:

1. A downlink signal constitution method, which is for a downlink of a cellular system using an orthogonal frequency division multiplexing access method, the downlink signal constitution method comprising: (a) coding, interleaving, and symbol-mapping data of a common channel and a control channel, and assigning fundamental pilot symbols, necessary for a demodulation of the common channel and the control channel, to time, frequency, and antenna; (b) receiving data to be transmitted through a traffic channel of each to user, and determining a transmission mode of each user according to the user's moving speed, channel information, and traffic requirement; (c) determining additional pilot symbols, additionally necessary for a demodulation of the traffic channel, according to the transmission mode and moving speed by users; and (d) coding, interleaving, and symbol-mapping the data of the traffic channel according to the transmission mode by users, and assigning the mapped symbols and the additional pilot symbols according to time, frequency, and antenna.

2. The downlink signal constitution method as claimed in claim 1, wherein the assignment of pilot symbols for the sub-carriers used by a first user group is different from the assignment of pilot symbols for the sub-carriers used by a second user group.

3. The downlink signal constitution method as claimed in claim 2, wherein the assignment of pilot symbols for the sub-carriers used by the first user group is denser than the assignment of pilot symbols for the sub-carriers used by the second user group.

4. The downlink signal constitution method as claimed in claim 3, wherein the first user group is a higher-speed user group than the second user group, and some of all the sub-carriers is previously allocated for the first user group.

5. The downlink signal constitution method as claimed in claim 1, wherein the step (c) of determining additional pilot symbols includes: using no additional pilot symbol, when the transmission mode of the traffic channel is using only a basic antenna with the moving speed of a mobile station being less than a reference value; and using pilot symbols for additional antenna, when the transmission mode of the traffic channel is using an additional antenna with the moving speed of the mobile station being less than the reference value.

6. The downlink signal constitution method as claimed in claim 1, wherein the step (c) of determining additional pilot symbols includes: additionally inserting pilot symbols for basic antenna in consideration of the moving speed of a mobile station, when the transmission mode of the traffic channel is using only a basic antenna with the moving speed of the mobile station exceeding a reference value; and additionally inserting pilot symbols for basic and additional antennas in consideration of the moving speed of the mobile station, when the transmission mode of the traffic channel is using an additional antenna with the moving speed of the mobile station exceeding the reference value.

7. The downlink signal constitution method as claimed in claim 1, wherein the step (d) of assigning additional pilot symbols includes generating traffic channel symbols previously in consideration of the number of the additional pilots.

8. The downlink signal constitution method as claimed in claim 1, wherein the step (d) of assigning additional pilot symbols includes generating symbols according to a maximum number of traffic channel symbols, and then puncturing at positions for transmitting the additional pilot symbols.

9. The downlink signal constitution method as claimed in claim 1, wherein the step (d) of assigning additional pilot symbols includes generating traffic channel symbols previously in consideration of a portion of the number of the additional pilot symbols, and then puncturing at positions for transmitting the rest of the additional pilot symbols.

10. A downlink signal constitution apparatus, which is for a cellular system using an orthogonal frequency division multiplexing access method, the downlink signal constitution apparatus comprising:

a first memory for storing traffic channel information of each user;

a second memory for storing channel information, traffic requirement, and moving speed information of each user;

a transmission user and transmission mode determiner for determining a transmission user and a transmission mode according to a defined method using the information stored in the second memory;

a traffic channel processor for reading the traffic channel information stored in the first memory according to the transmission mode determined by the transmission user and transmission mode determiner, and performing coding, interleaving, and symbol-mapping of the traffic channel;

an additional pilot symbol generator for generating additional pilot symbols necessary for a demodulation of the traffic channel, using the transmission mode determined by the transmission user and transmission mode determiner and the moving speed information stored in the second memory;

a time/sub-carrier/antenna mapper for multiplying the traffic channel symbols output from the traffic channel processor and the additional pilot symbols output from the additional pilot symbol generator by a channel gain by channels/users, and mapping the resulting symbols to time, sub-carrier, and antenna by a defined method;

a common/control channel processor for receiving common/control channel information, and performing coding, interleaving, and symbol-mapping of the received common/control channels; and a fundamental pilot symbol generator for generating a fundamental pilot symbol necessary for demodulation of the common/control channels.

* * * * *